G. A. Jasper

App's. for Drying Sugar.

No. 3,742. Reissued Nov. 23, 1869.

Witnesses

W. W. Grace

Chas. S. Crosby

Inventor

Gustavus A. Jasper

UNITED STATES PATENT OFFICE.

GUSTAVUS A. JASPER, OF CHARLESTOWN, MASSACHUSETTS.

IMPROVED APPARATUS FOR DRYING SUGAR AND OTHER LIKE ARTICLES.

Specification forming part of Letters Patent No. 90,549, dated May 25, 1869; Reissue No. 3,742, dated November 23, 1869.

*To all whom it may concern:*

Be it known that I, GUSTAVUS A. JASPER, an alien, now residing in Charlestown, in the State of Massachusetts, have invented a new and useful Apparatus for Drying Sugar; and I do hereby declare the following to be a full and correct description of the same, reference being had to the accompanying drawings, in which—

Figure 1:
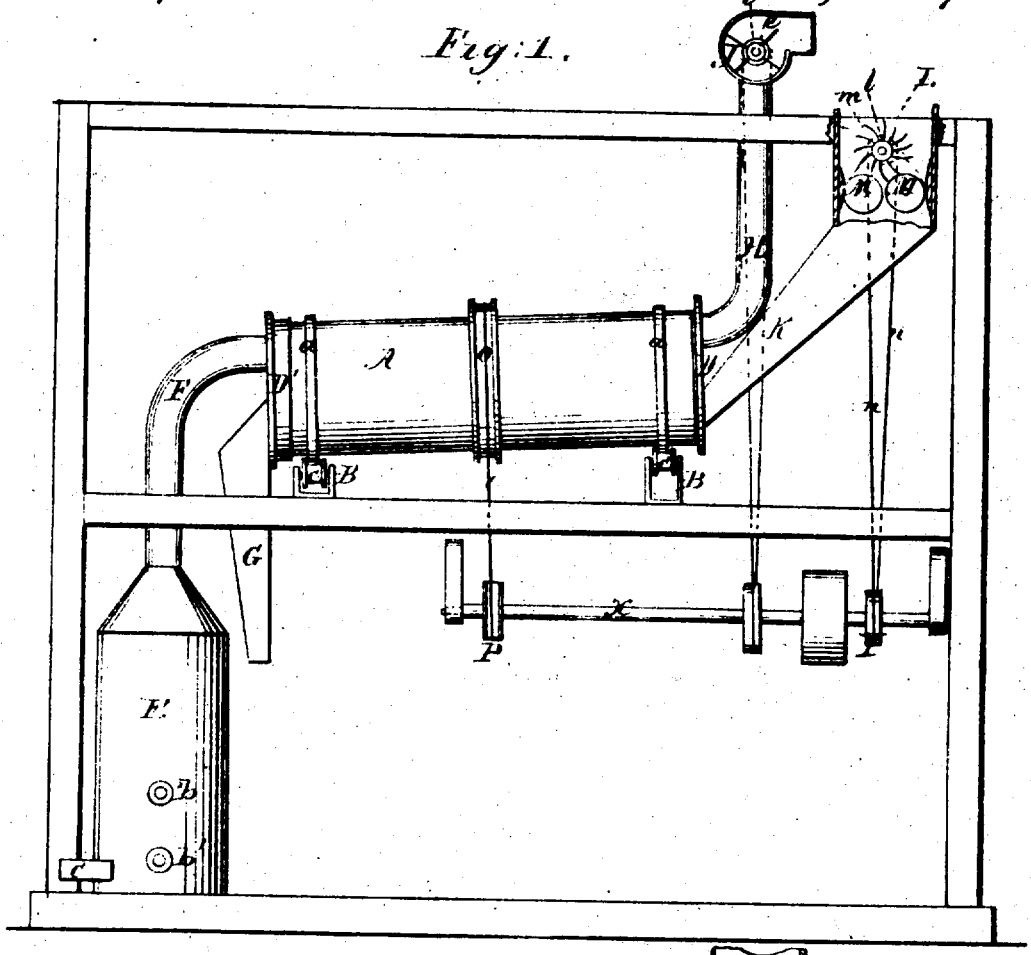
Figure 2:
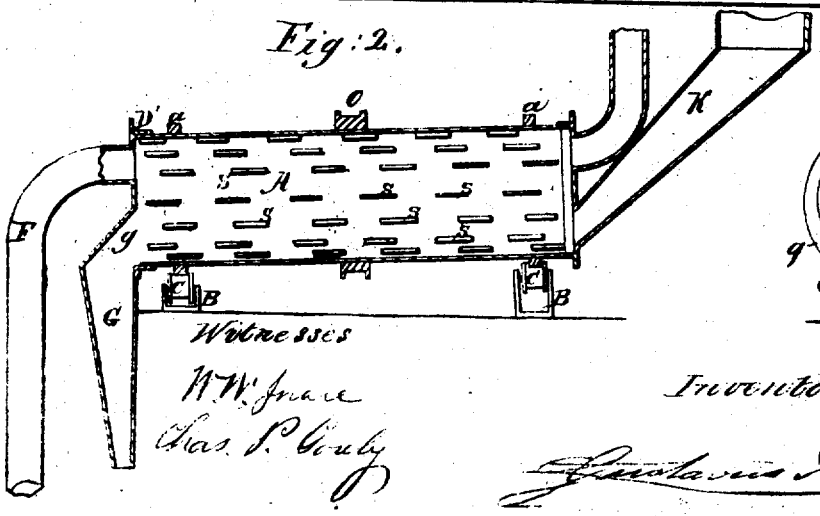
Figure 3:
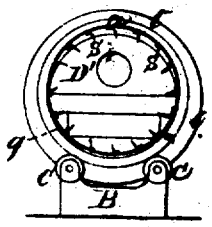

Figure 1 is a vertical section of my apparatus. Fig. 2 is a vertical longitudinal section of the drying-cylinder and parts attached to it. Fig. 3 is a vertical transverse section of the cylinder, showing the interior of the cylinder through the upper head, which is removed.

The nature of my invention consists in organizing and setting up an apparatus in which sugar and similar articles may be dried by the action of a current of air upon the articles to be dried.

By my invention a higher grade of sugar can be produced than by any drying apparatus hitherto devised.

There have been in use hitherto many contrivances for drying sugar. That which I think the best and have myself used consists of a steam-box provided with several sets of rakes which are employed in drawing the sugar forward from the end of the box at which it is introduced to the end at which it is discharged; but either from imperfections in the heated surface over which the sugar is drawn or from imperfections in the teeth of the rakes many of the crystals are burned and colored yellow or brown. These colored crystals cannot be separated from the other crystals, and the result of the drying is a sugar very perceptibly colored as compared with sugar dried by my present invention. Sometimes, too, the sugar is not wholly dried. Some of it lodging in the hollows of the imperfect heated surface prevents sugar passing over sugar so lodged from receiving the proper degree of heat. Again, the teeth of the rakes break and wear away the crystals and render them less transparent than they are when formed, thus injuring the quality of the sugar. Sugar has also been dried by introducing hot air into a chamber within which there are several circular horizontal plates parallel to each other and attached to an upright shaft which passes through the centers of the plates, and upon which they rotate. The sugar is placed upon the upper plate, and, after making one revolution, is brought against a scraper, which throws it through an opening in the plate down upon the next plate, where it remains for another revolution, and so on until it is discharged from the chamber; but unless this apparatus is built to a very great height it will not dry sugar, and even then, as there is no draft to carry off the hot air as it becomes saturated with moisture from the sugar, the confined air, before it extracts all the moisture, becomes heated to such a degree as to injure the sugar. In this apparatus, too, the sugar is subjected to a grinding operation by the scrapers, and many of the crystals are worn or broken. The use of my apparatus is attended with none of these difficulties.

I proceed to describe its construction and operation.

My apparatus can be used to the greatest advantage by erecting it so as to occupy a portion of three separate stories of the refinery. It is thus represented in the drawings, where A is a rotary cylinder about twenty feet in length and four feet in diameter, and made of wood lined with galvanized sheet iron or copper. It is placed in the second story of the refinery and mounted upon four friction-rollers, C, two near each end, having their axes parallel to the axis of the cylinder. The friction-rollers are mounted upon blocks B B′, the block B being considerably higher than the block B′, so that one end of the cylinder may be more elevated than the other, as shown in the drawings. The rollers are doubly flanged. The cylinder has two metal rings, *a a*, one near each end, which fit loosely between the flanges of the friction-rollers. The heads of the cylinder D and D′ do not revolve, but each head is provided with a flange or rim, the flange of the head D fitting closely within the revolving drying-cylinder, and the flange of the head D′ fitting closely without, as shown.

E is a metallic hot-air chest in the story below the drying-cylinder A, within which there is a coil of steam-pipe entering at *b* and coming out at *b′*. These pipes have valves for regulating the steam. The chest E is supplied with fresh air by the pipe or cold-air box *c* opening from the bottom of the chest to the outside of the building. This cold-air box has also a valve. (Not shown.)

F is a hot-air pipe leading from the top of the hot-air chest to the cylinder through the upper part of the stationary head D′, as shown.

G is a tunnel through which the sugar, after drying, falls into the sifting-machine in the story below. The mouth of the tunnel fits closely to the lower half of the head D′, which is cut away to allow the free egress of the sugar, as shown at *g* in Fig. 3.

H is an air pipe or flue leading from the upper part of the drying-cylinder through the upper part of the stationary head D to the story of the refinery above the cylinder or to the open air. The flue H is provided with a fan, J, which consists of several radial plates attached to a shaft, *e*, rotating in journals *f*. The plates of the fan are so placed in the mouth of the flue that as they rotate they create a strong draft through the flue and so through the drying-cylinder. The shaft *e* may be rotated by a fixed pulley, *i*, connecting by means of a belt, *h*, with a fixed pulley on the main shaft, as shown in the drawings; or the belt may connect with the shaft of a rotary cutter, to be presently described.

K is a tunnel through which the moist sugar from the centrifugals is conducted to the drying-cylinder. Its mouth is in the story above the drying-cylinder, as shown. The sugar is discharged into the drying-cylinder by a narrow opening through the stationary head D. The tunnel K has within, near the mouth, two rollers, M M, and a rotary cutter, L, as shown in the drawings, the combined action of which prevents the sugar from bridging over in the tunnel, or from falling in such masses as to clog up the narrower passages. The rotary cutter L has four series of knives or fingers attached spirally to a shaft, *l*, the fingers of each series being about four inches apart. The rollers M M are about four inches apart, and are so placed below the rotary cutter that the fingers, as they revolve, stir up the mass of sugar which lies upon and between the rollers. Care must be taken that the rollers are sufficiently large not to allow the sugar to fall in large masses between the outside of each and the side of the tunnel. The shaft *l*, to which the fingers are attached, is rotated by a fixed pulley, *m*, connected by a belt, *n*, with a pulley on the main shaft. Motion is given to the rollers M M by a belt connecting a fixed pulley on the main shaft with one of them, the two rollers being connected by another belt, so that they revolve toward each other and with equal velocity. The fixed pulley upon the shaft *l*, last spoken of, is of such diameter that the rotary cutter revolves with more than double the velocity of the rollers M M. The rotary cutter and the rollers may be so placed in reference to each other that the axis of the shaft *l* shall be parallel with the axes of the rollers, as shown in the drawings; or they may be so placed that the axis of the shaft *l* shall be at right angles with the axes of the rollers.

O is a grooved metallic ring firmly attached to the cylinder, as shown. The belt *o*, passing over the ring and around a fixed pulley on the main shaft, gives the required rotary motion to the cylinder. The inner surface of the drying-cylinder is provided with shelves or scoops *s s*, of galvanized iron or copper, as shown in the drawings. In this respect this part of the apparatus resembles rotary cylinders now used for washing charcoal. I break these shelves up into short lengths, as shown, for convenience in putting them in. They are arranged in reference to each other like steps, so that sugar falling cannot remain on the inner surface of the cylinder for any length of time without being taken by a shelf and again carried up.

The operation of my apparatus will be readily understood. A current of hot air from the chest E passes constantly through the rotary cylinder, entering by the pipe F and making its exit by the flue H. The draft of air through the cylinder is greatly increased by the action of the fan J. Instead of using the fan, the flue might be turned into a tall chimney to increase the draft. After the cylinder has been put in motion, with the current of hot air passing through it, the moist sugar is emptied into the mouth of the tunnel K in the third story. Any tendency to clog up or bridge over the tunnel is prevented, as before shown, by the action of the rotary cutter L and rollers M M, and the sugar falls to the story below, entering the drying-cylinder through the lower part of the stationary head D. The sugar entering the cylinder is immediately taken by the shelf *s* which happens to be nearest, and carried up by the revolution of the cylinder until the position of the shelf is such that it can no longer support it, when it falls to the bottom of the cylinder, to be carried up by another shelf, the operation being repeated until the sugar reaches the farther end of the cylinder and falls through the tunnel G into the sifting-machine in the first story of the building. The elevation of the head D above the head D′ causes the sugar every time it leaves a shelf to fall forward a little, and it is taken by a shelf nearer the farther end of the cylinder than the shelf by which it was last taken up. As sugar constantly enters the upper end of the cylinder, it is evident that there will be a continual rain of sugar all through the cylinder. The fall of the sugar tends to separate the crystals from each other, and the current of hot air acting upon each crystal separately dries it thoroughly.

In drying sugar and similar articles by my apparatus it is not always necessary that the air passing into the cylinder through what I have called the "hot-air pipe" should be heated. The condition of the atmosphere is frequently such that a current of air introduced directly from out-of-doors will sufficiently dry the sugar while passing through the cylinder. If the cylinder is built of a greater length, this will happen still more frequently. By my apparatus none of the crystals of the sugar are burned or colored. Nor are the crystals broken or worn away by any instrument rubbing or grinding them, as in apparatus previously described. The only wear upon the crystals comes from their falling against each other or against the surface of the cylinder, and the infinitely fine dust arising therefrom is carried off through the flue by the strong draft. The crystals leave the drying apparatus less worn and more transparent than they are to be found when dried by any apparatus or process hitherto devised for practically drying sugar in large quantities.

In the patent which I have surrendered to make application for this reissue I gave modifications of my apparatus which adapt it for cooling charcoal. I have since learned that previous to my invention charcoal had been cooled by apparatus in some respects similar to mine as so modified.

The object of this reissue is to disclaim such modifications, and in respect to drying sugar to make my claim apply more specifically to the apparatus described.

What I do claim, and desire to secure by Reissued Letters Patent, is—

1. The rotary cylinder A, provided with means for heating air, substantially as described, and means for carrying the heated air through the cylinder, substantially as described, for the purpose of drying the sugar and like articles by the action of the heated air.

2. The combipation of the rotary cutter L and rollers M M with a tunnel, substantially as described, for the purpose described.

The above specification of my said invention signed and witnessed, at Boston, this 9th day of October, A. D. 1869.

GUSTAVUS A. JASPER.

Witnesses:
CHAUNCEY SMITH,
WILLIAM W. SWAN.